(12) United States Patent
Maggard

(10) Patent No.: US 11,401,975 B2
(45) Date of Patent: Aug. 2, 2022

(54) NON-ROTATABLE SHAFT/HUB CONNECTION

(71) Applicant: MTD Products Inc, Valley City, OH (US)

(72) Inventor: Jay E. Maggard, Polk, OH (US)

(73) Assignee: MTD PRODUCTS INC, Valley City, OH (US)

( * ) Notice: Subject to any disclaimer, the term of this patent is extended or adjusted under 35 U.S.C. 154(b) by 47 days.

(21) Appl. No.: 16/859,127

(22) Filed: Apr. 27, 2020

(65) Prior Publication Data
US 2020/0347887 A1    Nov. 5, 2020

Related U.S. Application Data

(60) Provisional application No. 62/840,598, filed on Apr. 30, 2019.

(51) Int. Cl.
*F16D 1/108*    (2006.01)

(52) U.S. Cl.
CPC .................... *F16D 1/108* (2013.01)

(58) Field of Classification Search
CPC . F16D 1/02; F16D 1/05; F16D 1/0876; F16D 1/0888; F16D 1/09; F16D 1/092; F16D 1/095; F16D 1/10; F16D 1/101; F16D 1/108; F16D 1/112; F16D 1/116; F16D 2001/0903; F16D 2001/0955; F16D 2001/102; Y10T 403/63; Y10T 403/635; Y10T 403/7039; Y10T 403/7045; Y10T 403/76
USPC ..... 403/333, 334, 361, 364, 409.1; 464/182, 464/901
See application file for complete search history.

(56) References Cited

U.S. PATENT DOCUMENTS

| | | | |
|---|---|---|---|
| 826,944 A * | 7/1906 | Krieger | F16D 1/092 403/333 |
| 2,634,991 A | 4/1953 | Stevens | |
| 2,888,282 A | 5/1959 | Laurenz | |
| 3,282,614 A * | 11/1966 | Entrikin | F16D 1/05 403/182 |

(Continued)

FOREIGN PATENT DOCUMENTS

| | | | | |
|---|---|---|---|---|
| DE | 541417 C | * | 1/1932 | ............... F16D 1/05 |
| DE | 9416348 U1 | * | 11/1994 | ............... F16D 1/05 |

(Continued)

OTHER PUBLICATIONS

International Search Report and Written Opinion issued in International Application No. PCT/US2020/030037 dated Jul. 29, 2020; 12 pages.

*Primary Examiner* — Josh Skroupa
(74) *Attorney, Agent, or Firm* — Wegman Hessler

(57) ABSTRACT

A non-rotatable shaft/hub connection, providing a shaft having a tapered end and a bore, the tapered end having at least two angled faces; a hub having a tapered opening and an aperture, wherein the tapered opening is configured to receive the tapered end, the tapered opening provides at least two tapered portions. The non-rotatable shaft/hub connection provides an anti-backlash shaft/hub interface, having a shaft adapted to be rotatably driven about an axis of rotation, the shaft having a tapered end providing a tapered, double-D configuration; and a hub, having an opening configured to receive the double-D configuration of the tapered end.

16 Claims, 22 Drawing Sheets

(56) References Cited

U.S. PATENT DOCUMENTS

| | | | | |
|---|---|---|---|---|
| 3,485,520 | A * | 12/1969 | Alexander | F16D 1/02 403/334 |
| 4,942,999 | A * | 7/1990 | Oda | C04B 37/026 228/118 |
| 6,505,857 | B2 * | 1/2003 | Fosse | F16D 1/02 280/779 |
| 7,473,049 | B2 * | 1/2009 | Holowczak | F16D 1/027 403/334 |
| 8,001,725 | B2 * | 8/2011 | Lhotak | F16D 1/02 403/364 |
| 8,622,091 | B2 * | 1/2014 | Yamamoto | F16L 57/005 138/96 T |
| 9,133,883 | B2 | 9/2015 | Mori et al. | |
| 9,863,453 | B2 * | 1/2018 | Lovorn | F16B 7/0426 |
| 10,598,016 | B2 * | 3/2020 | Duijnhouwer | F16D 1/02 |
| 2004/0185945 | A1 | 9/2004 | Barron et al. | |
| 2018/0142736 | A1 * | 5/2018 | Kuebler | F16D 1/116 |

FOREIGN PATENT DOCUMENTS

| | | | | |
|---|---|---|---|---|
| DE | 19939729 A1 * | 2/2001 | | F16D 1/05 |
| DE | 102010064215 A1 * | 6/2012 | | F16D 1/092 |
| EP | 0794337 A1 * | 9/1997 | | F16D 1/108 |
| EP | 3032224 A2 | 6/2016 | | |
| JP | 58163822 A * | 9/1983 | | F16D 1/05 |
| WO | 2010037159 A1 | 4/2010 | | |

* cited by examiner

NON-ROTATABLE SHAFT/HUB CONNECTION

CROSS REFERENCE TO RELATED APPLICATIONS

This application claims the priority benefit to U.S. Provisional Patent Application Ser. No. 62/840,598 filed Apr. 30, 2019, the entirety of which is herein incorporated by reference.

FIELD OF THE INVENTION

The disclosed technology relates generally to non-rotatable shaft/hub connections, and in particular, but not exclusively to, a non-rotatable shaft/hub connection providing a tapered, double-D configuration that eliminates backlash.

BACKGROUND OF THE INVENTION

In conventional mower applications, shaft/hub connections are used in many ways for transmitting torques between a shaft and a hub. For example, with traditional mowers, each drive wheel is typically coupled to a drive shaft or axle of a mower with a hub. Generally, the hub is attached to the drive axle with a coaxial fastener or mounting bolt and transfers rotational power through mating surfaces provided on both the axle and the hub.

However, in certain applications, such as, for example, with a zero-radius-turning mower, backlash is undesirable and the clearance or relative motion between the axle and the hub should be minimized. Such backlash can lead to mechanical issues (such as premature wear) and control issues, both caused by the shaft wandering which mechanically causes unintended motion.

With traditional non-friction based shaft/hub interfaces (for example, keys, splines, conical pressure connections, or the like), the transfer of torque is limited by the clamp load from the coaxial fastener or bolt and static friction capability of the material. Other configurations that have been found to reduce backlash include, for example, an axle and hub using a key and keyway to transfer torque. However, key/keyway and spline configurations only reduce or eliminate lash in special press fit applications. Additionally, tapers have been used in many applications, but typically only in a conical configuration.

Therefore, what is needed in the art is a non-rotatable shaft/hub connection providing a tapered, double-D configuration that eliminates backlash.

SUMMARY OF THE INVENTION

The disclosed technology generally described hereinafter provides for a non-rotatable shaft/hub connection. The non-rotatable shaft/hub connection comprises a shaft portion having a tapered end; and a hub portion having a tapered opening configured to receive the tapered end.

In some embodiments, the tapered end comprises a pair of angled faces. In some embodiments, the pair of angled faces are tapered and angled toward each other. In some embodiments, the tapered end comprises a tapered, double-D configuration. In some embodiments, the tapered opening of comprises at least two angled, tapered portions. In some embodiments, the hub portion provides a tapered, double-D configuration.

In some embodiments, the hub portion fully receives and encompasses the tapered end of the shaft portion. In some embodiments, the shaft portion further comprises a bore. In some embodiments, the hub portion further comprises an aperture.

In yet another aspect of the disclosed technology, a non-rotatable shaft/hub connection is provided. The non-rotatable shaft/hub connection comprises a shaft having a tapered end and a bore, the tapered end providing at least two angled faces; a hub having a tapered opening and an aperture, wherein the tapered opening is configured to receive the tapered end, the tapered opening providing at least two tapered portions.

In some embodiments, the at least two angled faces are tapered. In some embodiments, the at least two tapered portions are angled. In some embodiments, the tapered portions extend essentially through the hub. In some embodiments, the tapered portions of the hub abuttingly engage with the angled faces of the tapered end. In some embodiments, the tapered end comprises a tapered, double-D configuration. In some embodiments, the hub is configured to receive the double-D configuration of the tapered end.

In some embodiments, the hub is provided in a forked configuration. In some embodiments, the bore and the aperture are axially aligned. In some embodiments, a fastener extends through the bore and is received by the aperture to axially clamp together the shaft and the hub.

In yet another aspect of the disclosed technology, an anti-backlash shaft/hub interface is provided. The anti-backlash shaft/hub interface comprises a shaft adapted to be rotatably driven about an axis of rotation, the shaft having a tapered end providing a tapered, double-D configuration; and a hub, having an opening configured to receive the double-D configuration of the tapered end.

In some embodiments, the shaft and the hub are coupled together to provide a lash-free connection. In some embodiments, the shaft further comprises a bore, and the hub further comprises an aperture. In some embodiments, the bore and the aperture are axially aligned. In some embodiments, a fastener extends through the bore and is received by the aperture to axially clamp together the shaft and the hub. In some embodiments, the tapered end comprises at least two angled faces, and the opening comprises at least two tapered portions. In some embodiments, the at least two angled faces abuttingly engage with the at least two tapered portions to eliminate backlash during rotation.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which.

Figure 1A:
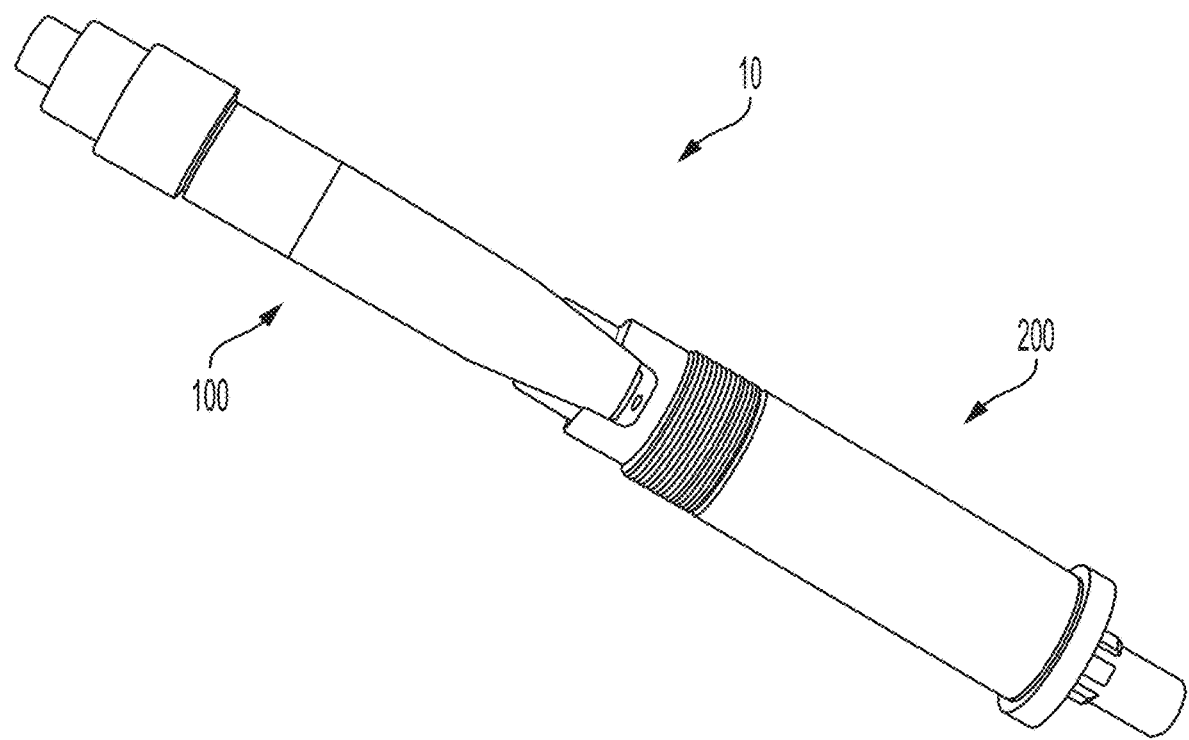
FIGS. 1A-C provide side isometric views of an illustrative embodiment of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION OF THE EMBODIMENTS

The disclosed technology generally described hereinafter provides for a non-rotatable shaft/hub connection. The non-rotatable shaft/hub connection removes backlash associated with non-friction based shaft/hub interfaces when clamped together axially, (such non-friction based examples include those with keys, splines, flat D's, or the like, which are never clamped together axially). The shaft/hub connection as described herein can be used in applications such as, but not limited to, mowers, riding mowers, zero-radius-turning lawn mowers, agriculture equipment, industrial equipment (e.g. pumps, blowers, etc.), automotive, robotics, transmissions, and/or the like.

In terms of the present disclosure, the term "anti-backlash" may also be described as "lash-free," or "play-free." Backlash, sometimes called lash or play, can be described as a clearance or lost motion in a mechanism caused by gaps between the parts. It can sometimes be defined as the maximum distance or angle through which any part of a mechanical system may be moved in one direction without applying appreciable force or motion to the next part in mechanical sequence. Backlash is often experienced when the direction of movement is reversed, and the slack or lost motion is taken up before the reversal of motion is complete.

In terms of the present disclosure, "non-rotatable" describes how torque is driven without continuous slipping, (similar to how a torque converter drives torque, which transfers rotating power from a prime mover to a rotating driven load).

Figure 1B:
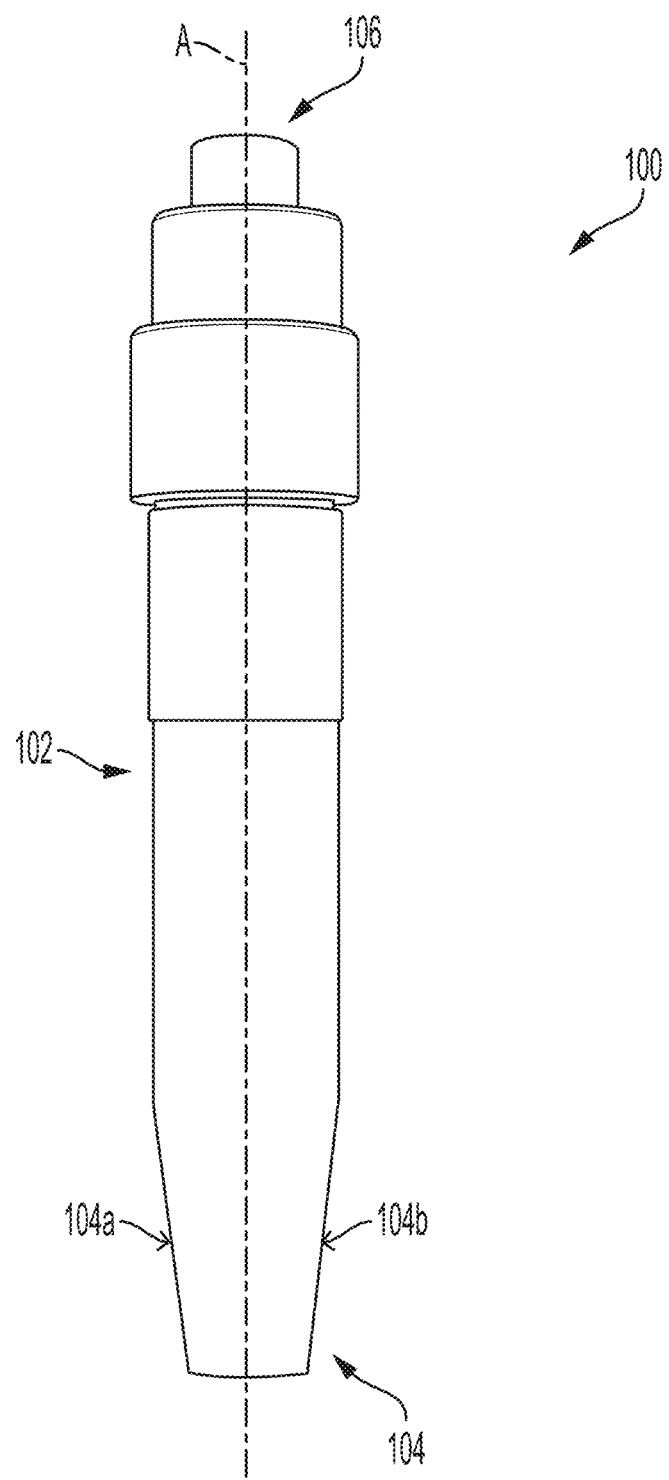
Figure 1C:
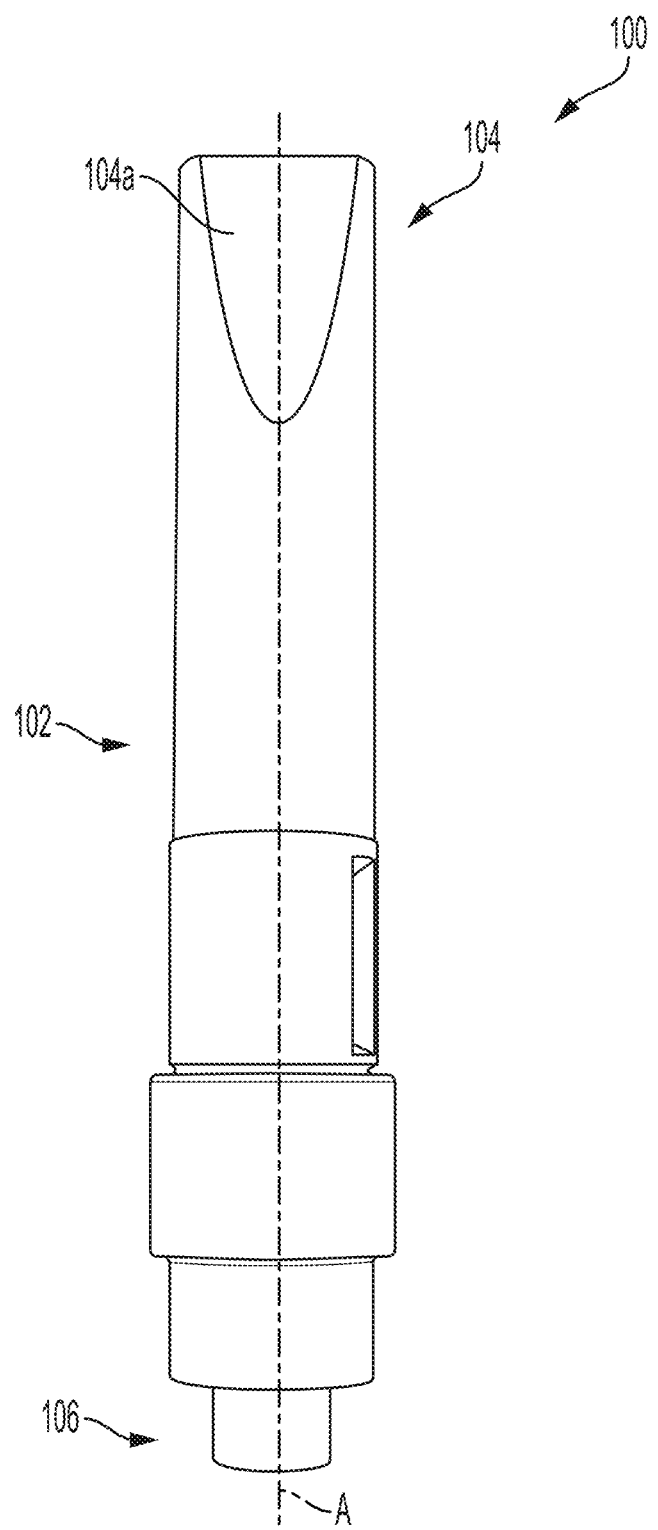

With reference to FIG. 1A, a non-rotatable shaft/hub connection is provided. The non-rotatable shaft/hub connection 10 comprises a shaft portion 100 and a hub portion 200. As shown in FIGS. 1B-C, the shaft portion 100 comprises a shaft body 102, a tapered proximal end 104, and a distal end 106.

Figure 2:
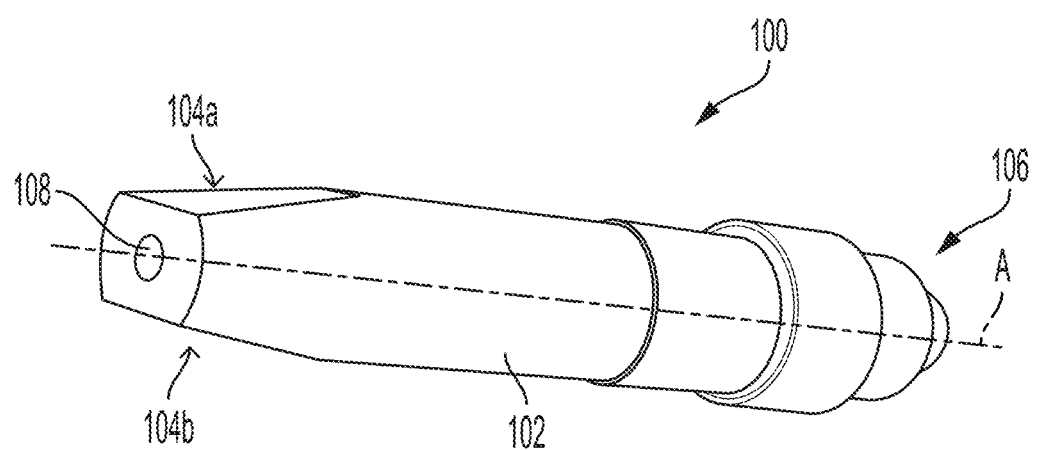
FIG. 2 is a side isometric view of an illustrative embodiment of the disclosed technology.

As shown in FIGS. 1-2, the shaft body 102 is generally cylindrical having a central axis A and a bore 108 extending along the central axis and throughout the shaft body 102 (i.e. extending from the tapered proximal end 104 to and through the distal end 106). It should be understood that the shaft body 102 can be made of most any material sufficient to provide adequate torque transmission. In some embodiments, the shaft body 102 is made of aluminum, iron, steel, carbon steel, stainless steel, or the like.

It should also be understood that the shaft body 102 can be of any length sufficient to provide the shaft/hub connection. In some embodiments, the shaft body 102 is at least 100 millimeters (mm) in length.

Figure 3A:
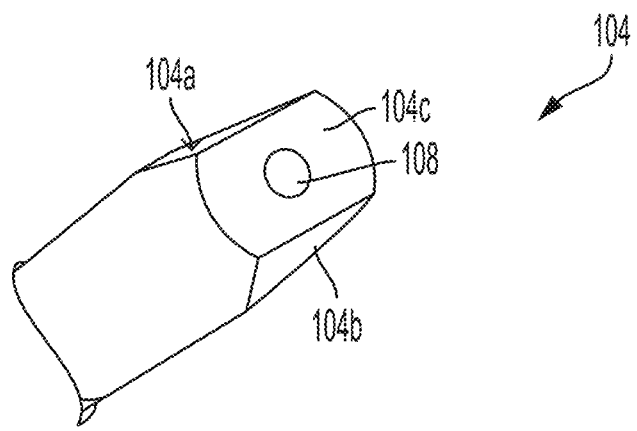
FIGS. 3A-B provide side isometric views of an illustrative embodiment of the disclosed technology.
Figure 3B:
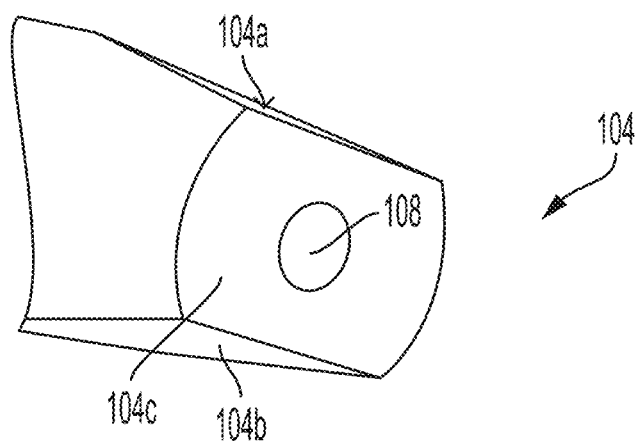
Figure 4:
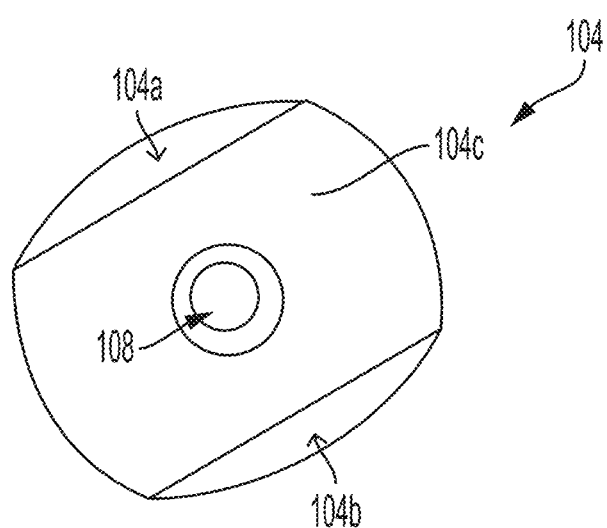
FIG. 4 is a top isometric view of an illustrative embodiment of the disclosed technology.

With reference to FIGS. 1-4, the shaft 100 comprises a tapered proximal end 104. The tapered proximal end 104 provides an angled, tapered "double-D" configuration, comprising a pair of tapered, angled faces 104a, 104b and an end face 104c. This "double-D" configuration should be understood as providing a shaft end with a flattened-round shape (sometimes referred to as "diametrically opposed flats"), wherein the two flattened portions are opposite to each other (i.e. the edges of the pair of angled faces 104a, 104b), and the two round portions of the flattened-round shape are opposite to each other and are consistent with the cylindrical shape of the shaft body 102 (as best shown in FIGS. 3-4). Through this tapered double-D configuration, the tapered proximal end 104 allows torque to be transmitted/transferred, yet removes backlash when tightened together axially with a bolt or similar fastener.

As opposed to traditional conical faces, the angled faces 104a, 104b allow for a taper-quality that fits with the torque capacities of anti-rotation features and allows for easy disassembly without special tools (e.g. like a press-fit application would require).

The angled faces 104a, 104b are opposite to each other, wherein the angle of each face is angled toward the central axis A (as best shown in FIG. 2), and where each angled face 104a, 104b is tapered. In some embodiments, the angled faces 104a, 104b are angled at an angle that is greater than 5°. In other embodiments, the angled faces 104a, 104b are angled at an angle of approximately 5-25°.

In some embodiments, the angled faces 104a, 104b are identical in dimension and surface area. However, it should be understood that the angled faces 104a, 104b can be of the same or different dimension and surface area, as long as the tapered proximal end 104 provides a tapered double-D configuration.

Figure 5A:
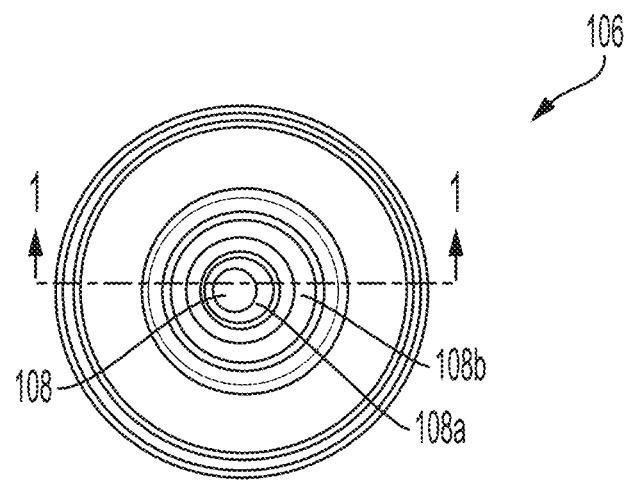
FIG. 5A-B provide top isometric views of an illustrative embodiment of the disclosed technology.
Figure 5B:
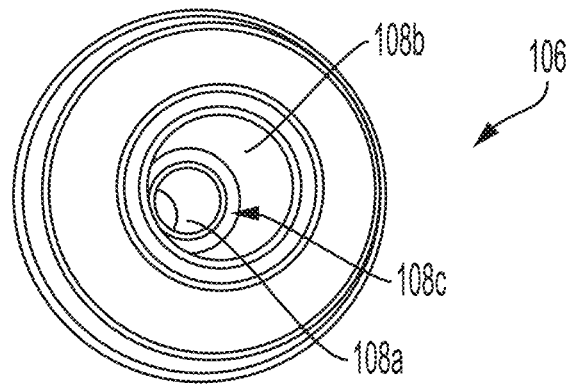

With reference to FIGS. 5A-B, the distal end 106 of the shaft portion 100 is provided. The bore 108 extends along the central axis A and through the shaft body 102 and is generally shaped to receive a fastener. In some embodiments, the fastener is a threaded fastener, bolt, or the like. The fastener is generally received by the distal end 106, where it passes through the bore 108.

Figure 5C:
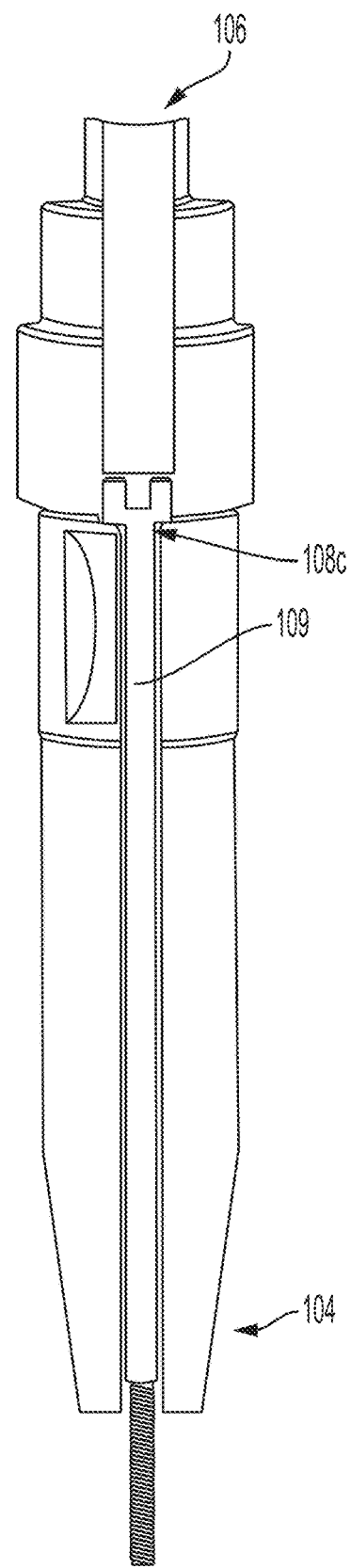
FIG. 5C is a cross-sectional view taken along the line 1-1 of an illustrative embodiment of the disclosed technology.

As best shown in FIG. 5A-C, the bore 108 includes an inner portion 108a and an exterior end portion 108b, located toward the distal end 106 of the shaft. The exterior end portion 108b of the bore 108 provides a slightly larger circumference (than as compared to the inner portion 108a), such that a lip 108c is provided. As shown in FIG. 5C, when a fastener 109 is received, the head of the fastener is abuttingly engaged with the lip 108c, so that when the fastener is tightened, the fastener provides the axial clamp load into the taper of the hub.

Figure 6:
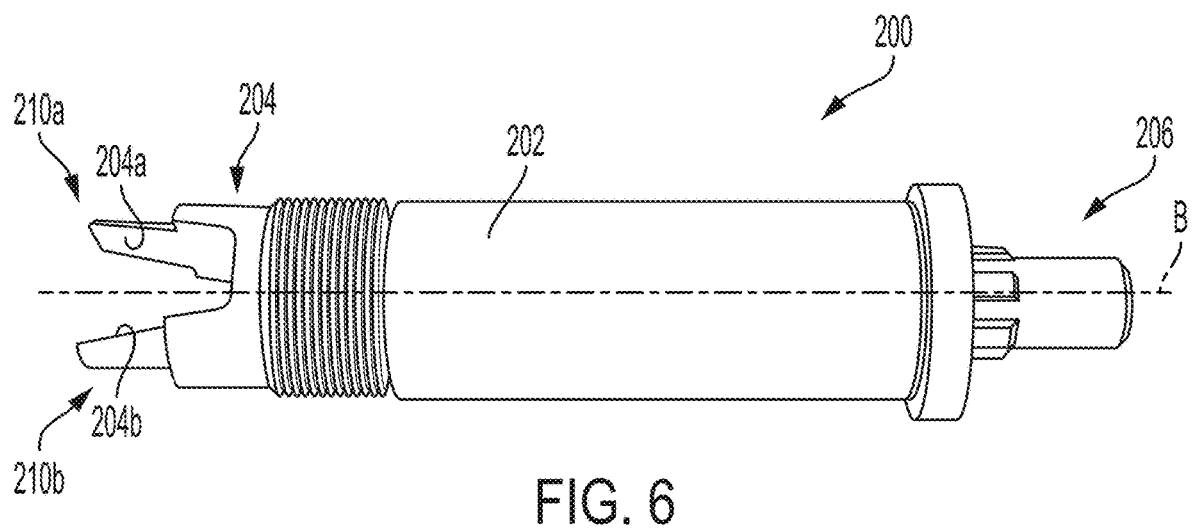
FIG. 6 is a side isometric view of an illustrative embodiment of the disclosed technology.
Figure 7A:
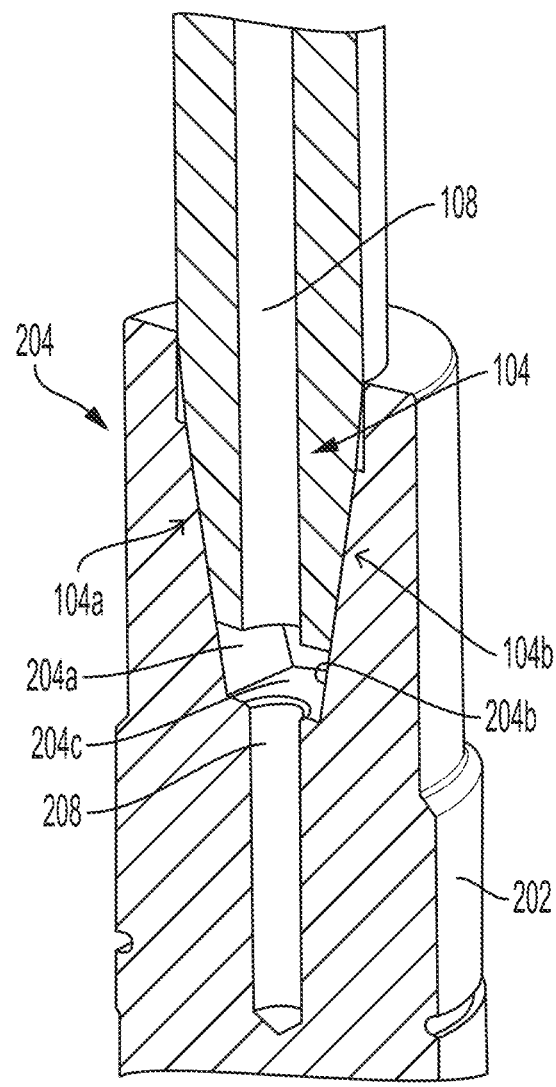
FIGS. 7A-B provide cross-sectional side views of an illustrative embodiment of the disclosed technology.
Figure 7B:
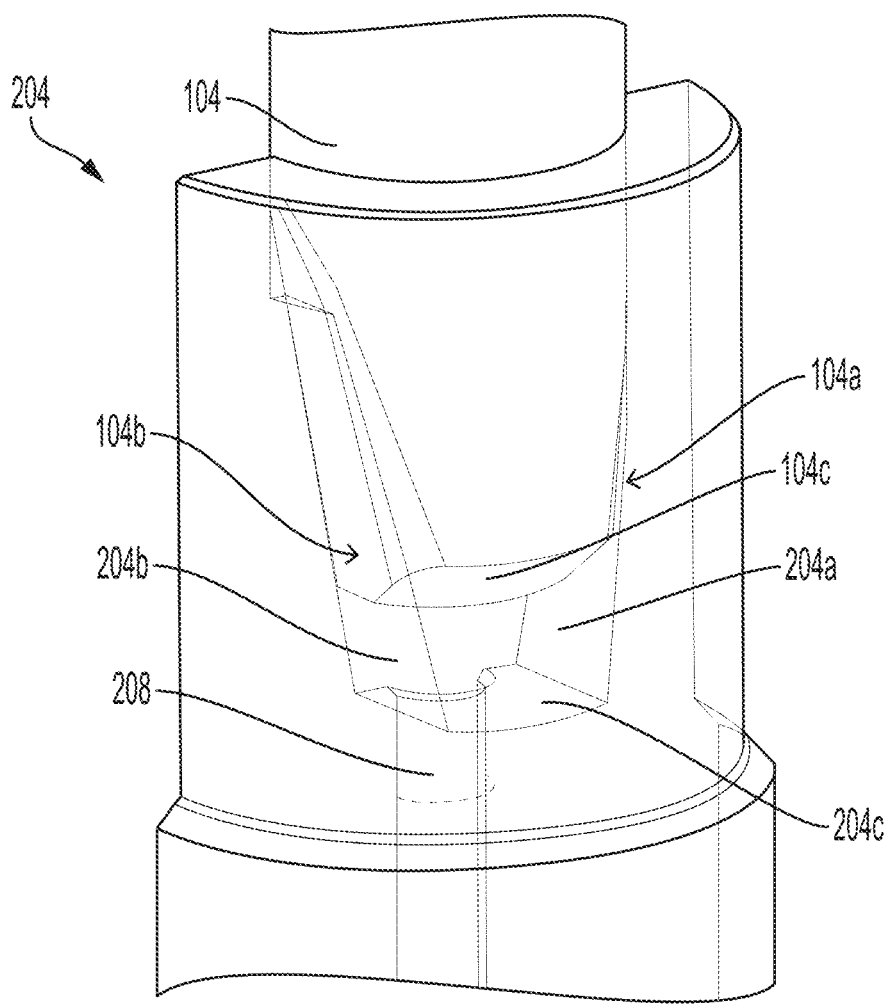
Figure 8:
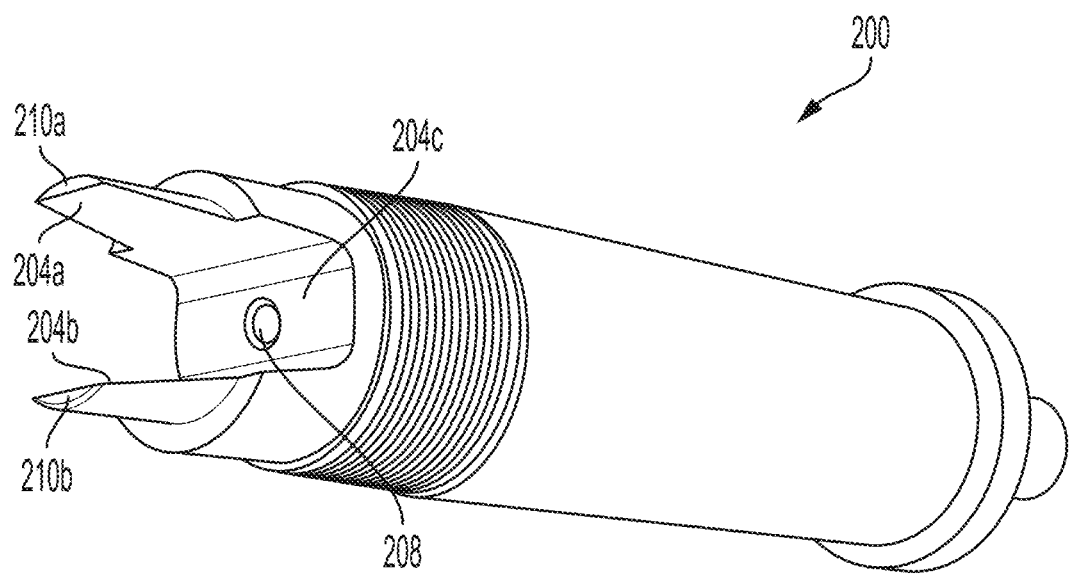
FIG. 8 is a side isometric view of an illustrative embodiment of the disclosed technology.

Now referring to FIGS. 6-8, the non-rotatable shaft/hub connection further comprises a hub portion 200. The hub portion 200 generally receives the shaft portion 100 to provide the non-rotatable shaft/hub connection. It should be understood that the hub portion 200 can be made of the same or different material as the shaft portion 100.

As best shown in FIG. 6, the hub portion 200 comprises a hub body 202, a hub 204, and a distal end 206. The hub body 202 is generally cylindrical having a central axis B extending along the central axis. It should be understood that the hub body 202 can be made of most any material sufficient to provide adequate torque transmission. In some embodiments, the hub body 202 is made of aluminum, iron, steel, carbon steel, stainless steel, or the like.

In some embodiments, the hub body 202 is at least 100 mm in length. It should also be understood that the hub body 202 can be of any length sufficient to provide the shaft/hub connection.

The hub 204 is generally shaped or configured to receive the tapered proximal end 104 of the shaft portion 100. The hub 204 comprises two, angled tapered portions 204a, 204b, an interior hub face 204c, and an aperture 208. The tapered portions 204a, 204b are angled in such a manner as to mirror, or be identical to, the angle of the angled faces 104a, 104b of the tapered proximal end 104.

In some embodiments, the hub 204 is provided in a pocket configuration (see FIGS. 7A-B). This pocket configuration provides increased strength from bursting and driving torque. In such embodiments, the hub 204 fully receives and encompasses the tapered proximal end 104. In some embodiments, when fully received, the end face 104c of the tapered proximal end 104 abuttingly engages with the interior hub face 204c. In such embodiments, the hub 204 is shaped to receive the exact configuration of the tapered proximal end 104, such that the tapered portions 204a, 204b are the exact size and shape of the angled faces 104a, 104b of the tapered proximal end 104. In other embodiments, the tapered portions 204a, 204b are not the exact size and shape of the angled faces 104a, 104b of the tapered proximal end 104, yet still provide the same lash-free benefits of the disclosed technology.

Figure 9:
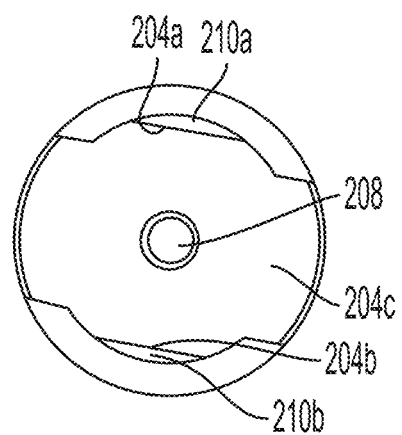
FIG. 9 is a top isometric view of an illustrative embodiment of the disclosed technology.
Figure 10A:
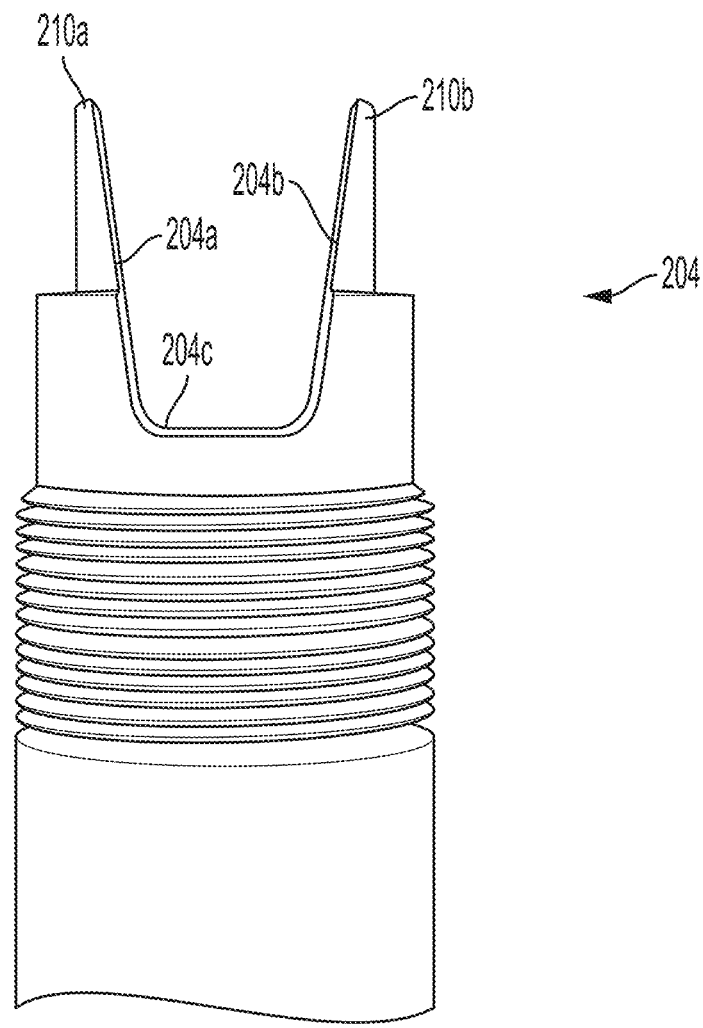
FIGS. 10A-B provide side isometric views of an illustrative embodiment of the disclosed technology.
Figure 10B:
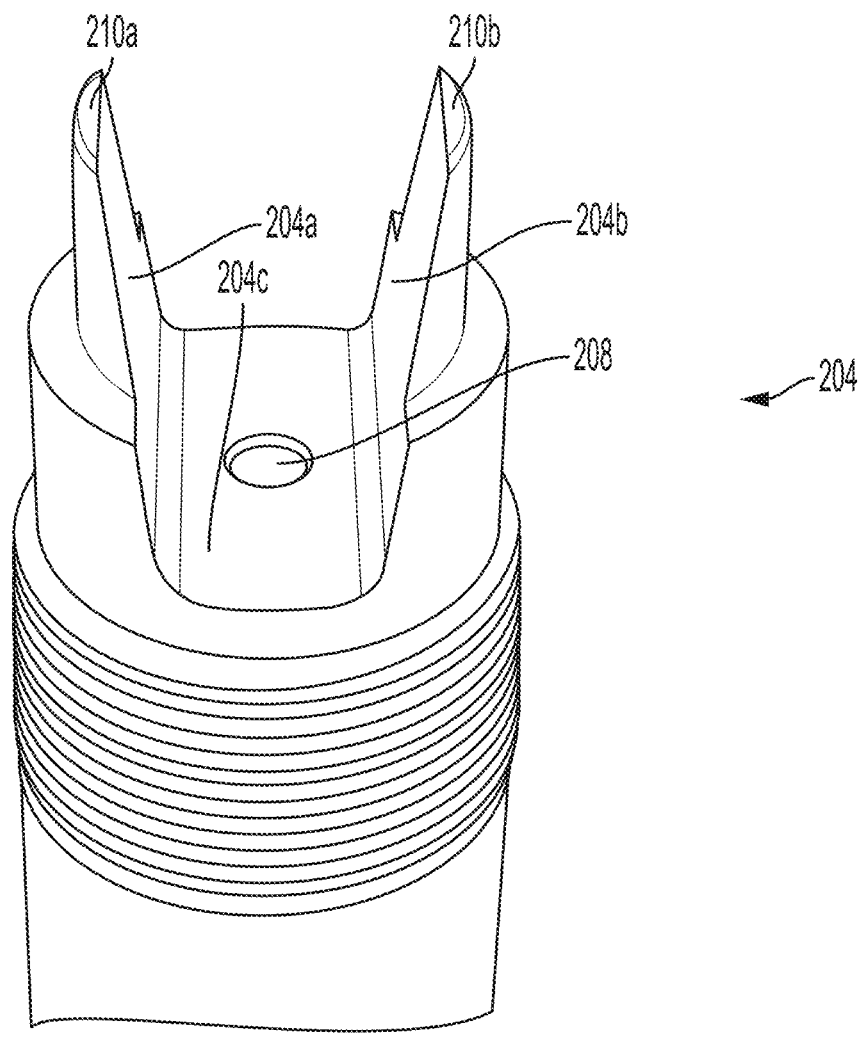

In some embodiments, the hub 204 is provided in a forked configuration (see FIGS. 8-10). In such embodiments, the two, angled tapered portions 204a, 204b extend essentially through the entire hub 204, where the angled tapered portions 204a, 204b are provided by two prongs 210a, 210b, respectively (as best shown in FIG. 10B). The prongs 210a, 210b are also angled in the same manner as the angle of the angled faces 104a, 104b of the tapered proximal end 104 (as best shown in FIG. 11A).

Figure 11A:
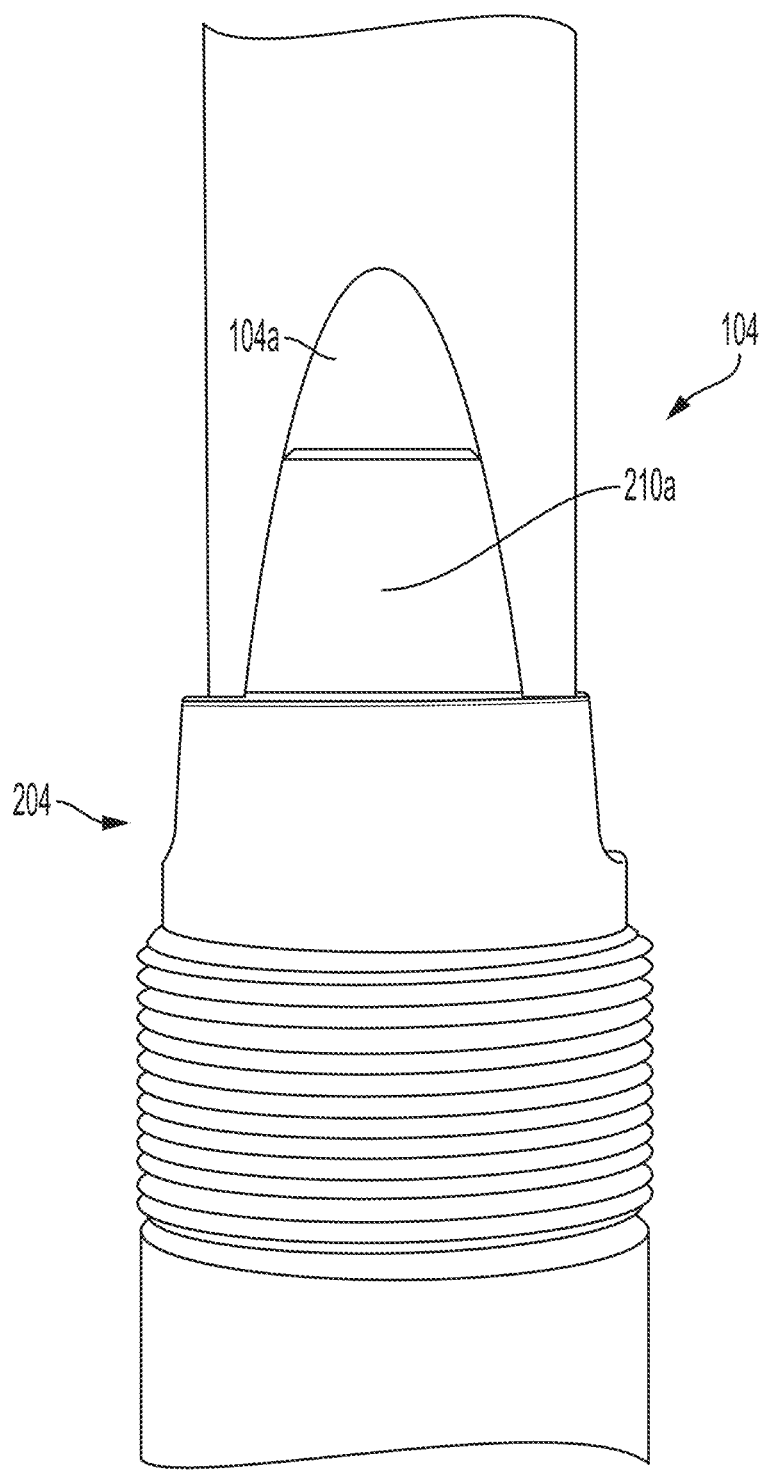
FIGS. 11A-B provide side isometric views of an illustrative embodiment of the disclosed technology.
Figure 11B:
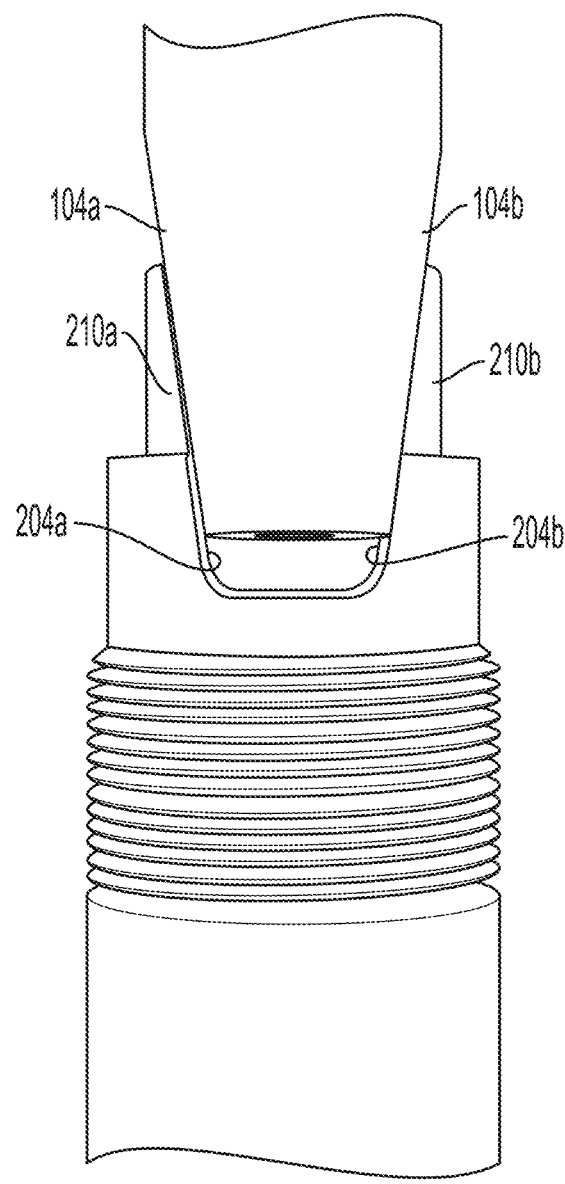

Referring now to FIGS. 11A-B, when the hub 204 fully receives the tapered proximal end 104, the tapered portions 204a, 204b of the hub 204 abuttingly engage with the angled faces 104a, 104b of the tapered proximal end 104 (as best shown in FIG. 11B). In some embodiments, when the tapered proximal end 104 is received by the hub 204, the engagement of the angled faces 104a, 104b with angled tapered portions 204a, 204b complete the profile of the shaft body 102. In some embodiments, when received, the end face 104c of the tapered proximal end 104 does not abuttingly engage with the interior hub face 204c.

Figure 12A:
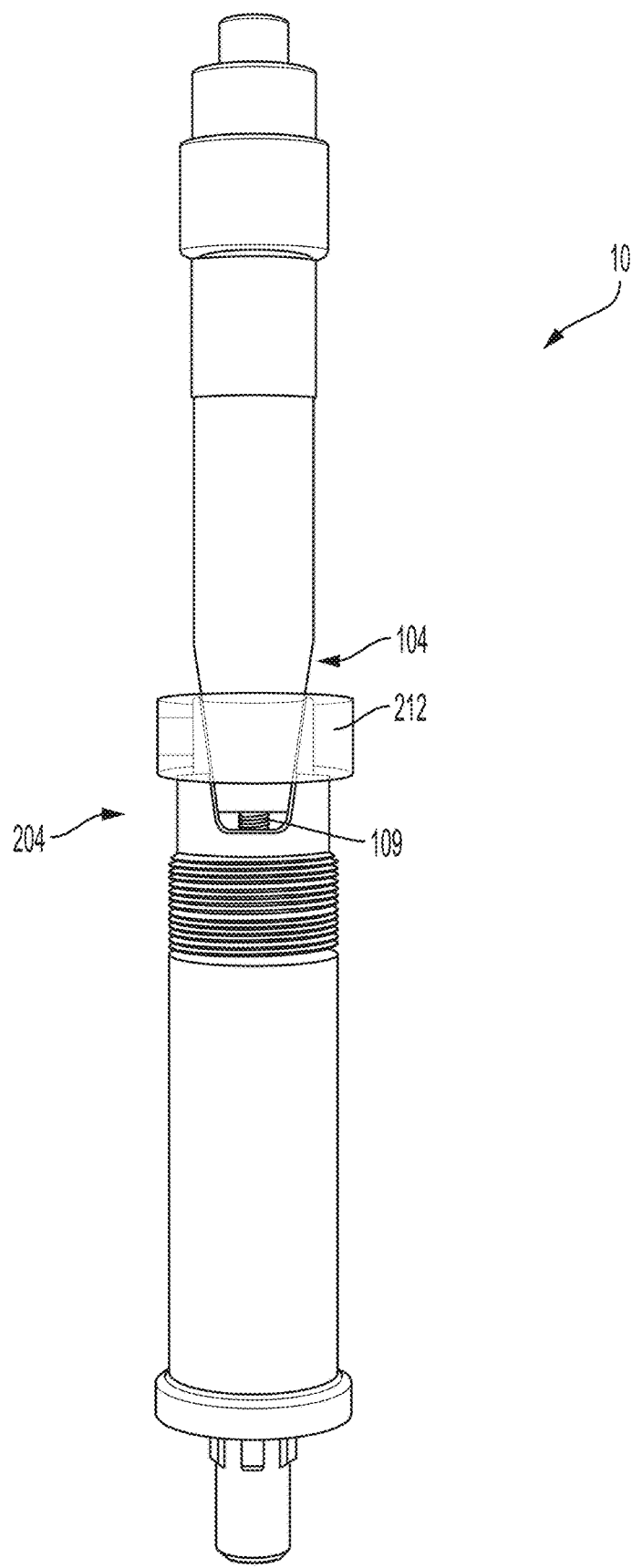
FIG. 12A is a side isometric view of an illustrative embodiment of the disclosed technology.
Figure 12B:
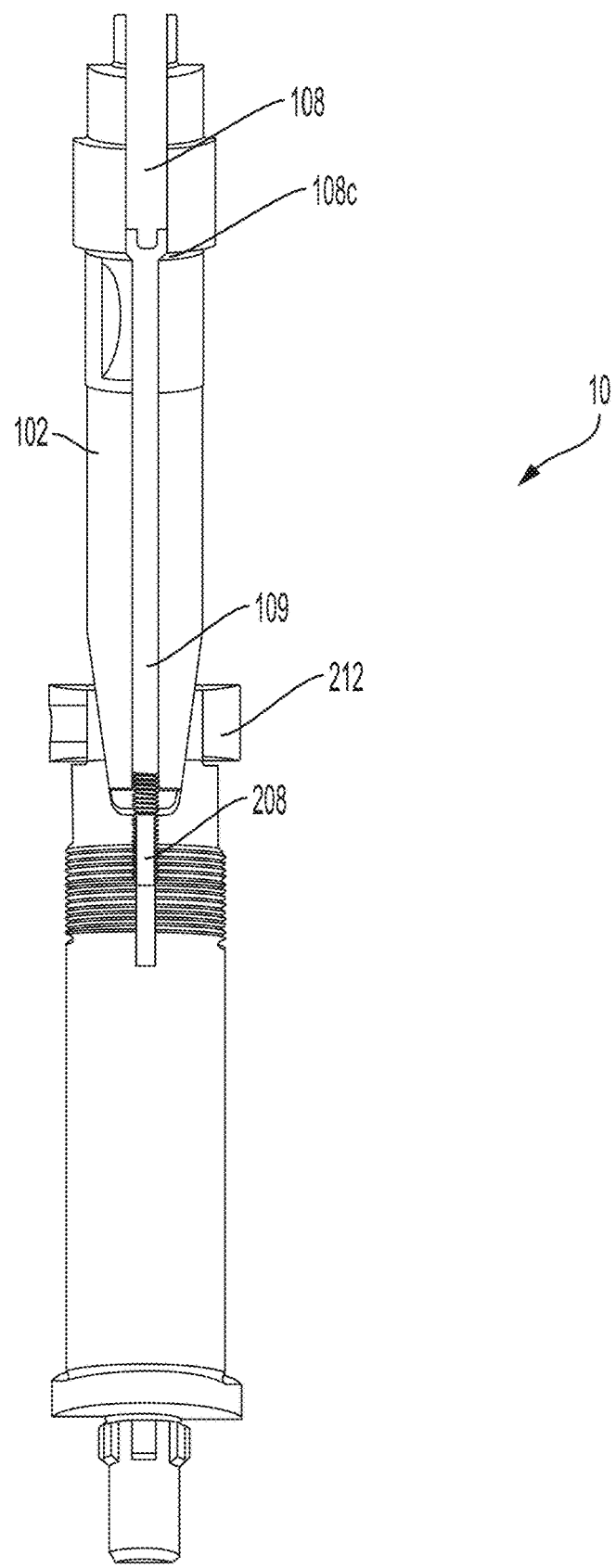
FIGS. 12B-C provide a cross-sectional side view of an illustrative embodiment of the disclosed technology.
Figure 12C:
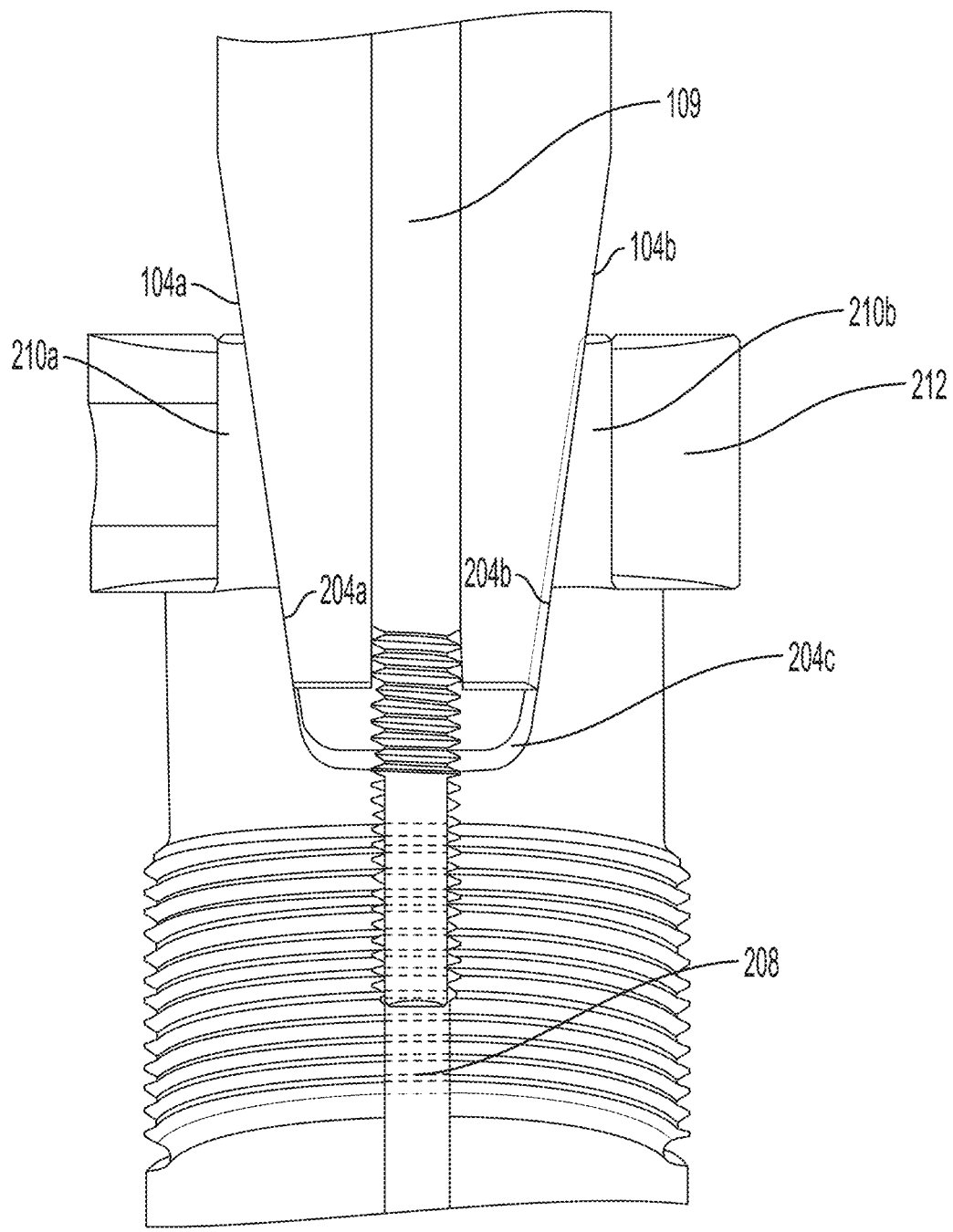

As shown in FIGS. 12A-C, the tapered proximal end 104 and the hub 204 are shown coupled together to provide the non-rotatable shaft/hub connection 10. When coupled, the bore 108 of the shaft portion 100 and the aperture 208 of the hub portion 200 are axially aligned, such that the fastener 109 is able to pass through the bore 108 of the shaft body 102 and engage the aperture 208 to axially clamp together the shaft portion 100 and the hub portion 200 (as best seen in FIGS. 12B-C).

By axially clamping together the shaft 100 and the hub 200 (through the threaded fastener 109), compressive force is provided through the double-D configuration and/or the interaction of the angled faces 104a, 104b and the tapered portions 204a, 204b, (i.e. the angled faces 104a, 104b are fixed and press against the tapered portions 204a, 204b, and vice versa). The double-D configuration of the non-rotatable shaft/hub connection provides the constant contact or compressive force required during rotation of the shaft/hub connection to eliminate backlash. When this constant contact is maintained, it eliminates any gaps, slippage, or rotation of the tapered proximal end 104 from the hub 204 (or vice versa) while torque is being transferred, and provides a lash-free connection.

Figure 13A:
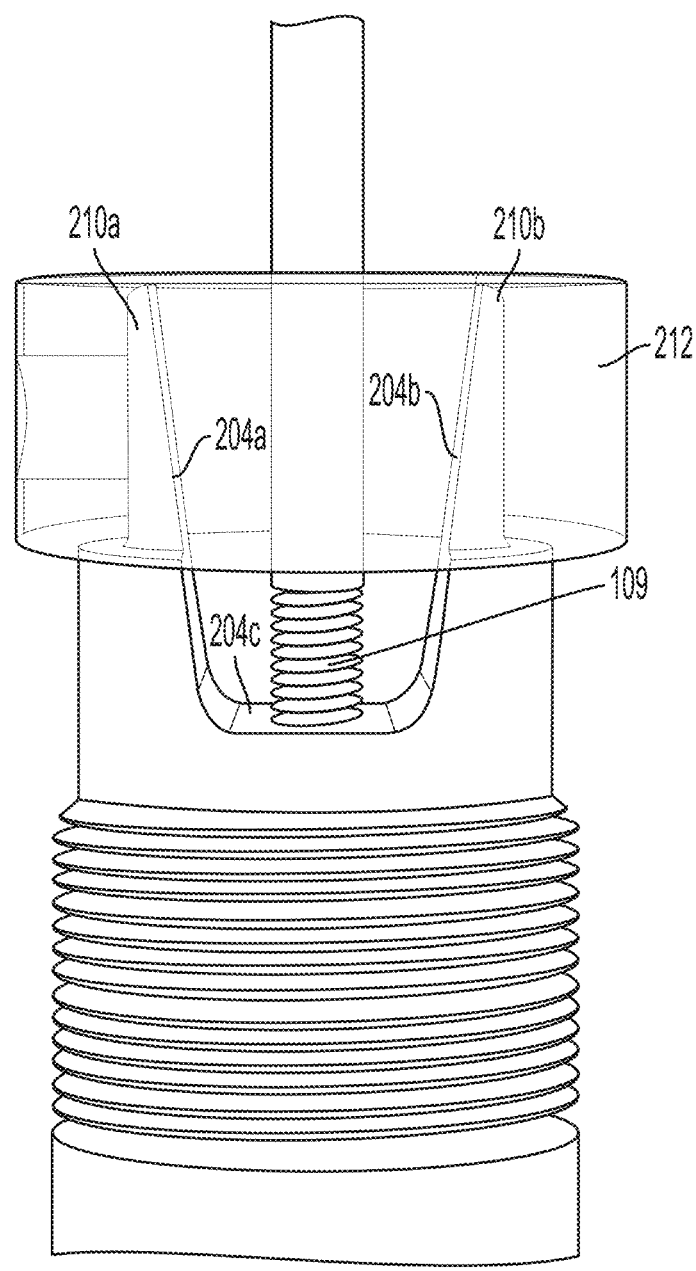
FIGS. 13A-B provide side isometric views of an illustrative embodiment of the disclosed technology.
Figure 13B:
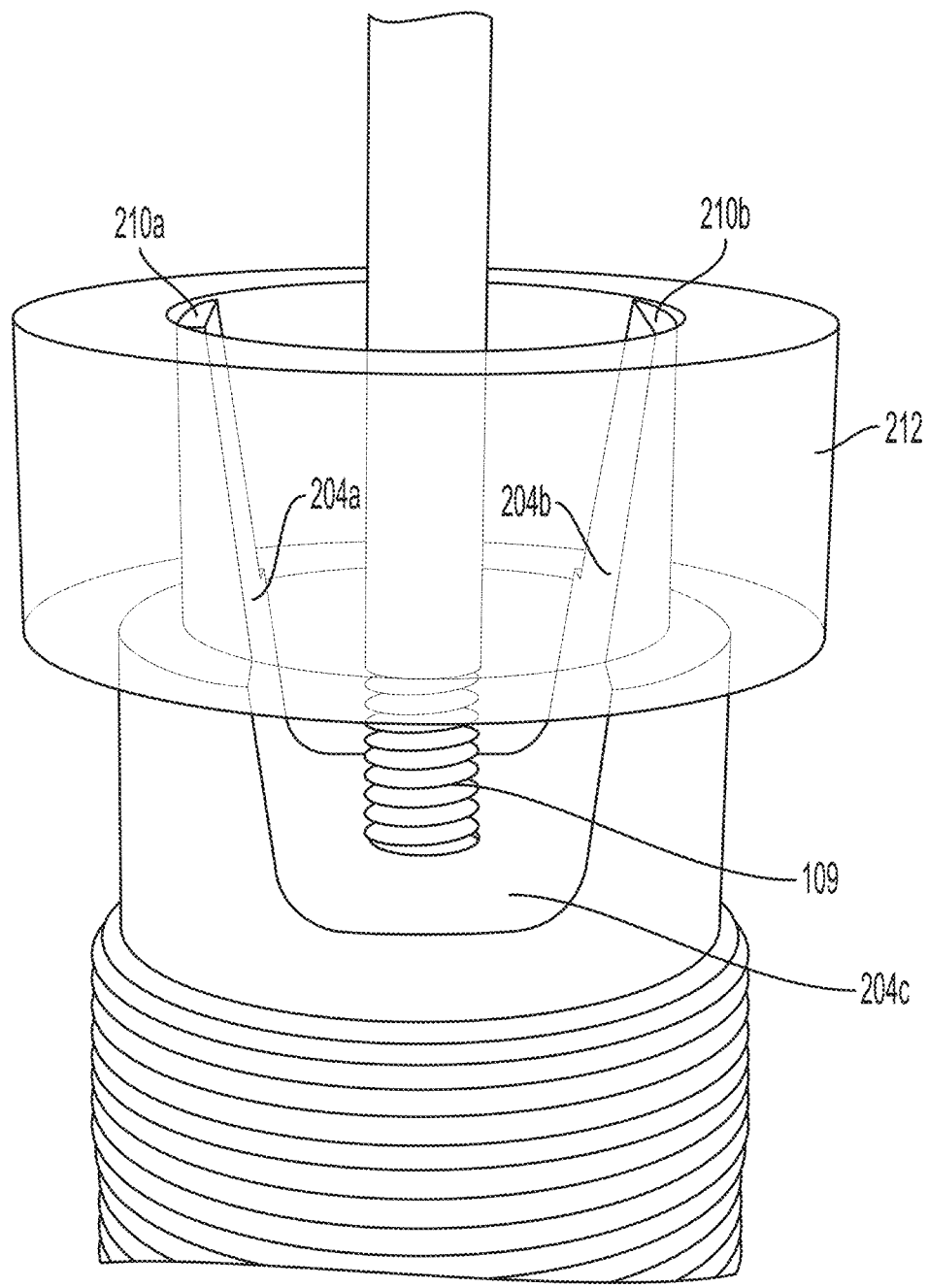

With reference to FIGS. 12-13, in some embodiments, the shaft/hub connection 10 further comprises a collar 212. The collar 212 is placed around hub 204, specifically encompassing the outer exterior of the two prongs 210a, 210b. The collar 212 provides additional alignment, strength, and stability to the shaft/hub connection during rotation. It should be understood that the collar 212 can be clamped together by/through any conventional means, such as, but not limited to, a set screw, c-style or u-style clamp, etc.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A non-rotatable shaft/hub connection, comprising:
   a cylindrical shaft portion having a tapered end and a bore extending along a central axis and throughout the shaft portion; and
   a hub portion having an aperture and a tapered opening configured to receive the tapered end, wherein the hub portion provides a tapered, double-D configuration, and
   wherein the bore of the shaft portion and the aperture of the hub portion are axially aligned such that a threaded fastener can pass through the bore of the shaft body and engage the aperture to axially clamp together the shaft portion and the hub portion.

2. The shaft/hub connection as recited in claim 1, wherein the tapered end comprises a pair of angled faces, and wherein the pair of angled faces are tapered and angled toward each other.

3. The shaft/hub connection as recited in claim 1, wherein the tapered end comprises a tapered, double-D configuration.

4. The shaft/hub connection as recited in claim 1, wherein the tapered opening of comprises at least two angled, tapered portions.

5. The shaft/hub connection as recited in claim 1, wherein the hub portion fully receives and encompasses the tapered end of the shaft portion.

6. A non-rotatable shaft/hub connection, comprising:
   a shaft having a tapered end and a bore, the tapered end providing at least two angled faces, wherein the tapered end comprises a tapered, double-D configuration; and
   a hub having a tapered opening and an aperture, wherein the tapered opening is configured to receive the tapered end, the tapered opening providing at least two tapered portions; and
   a fastener extending through the bore and received by the aperture to axially clamp together the shaft and the hub.

7. The shaft/hub connection as recited in claim 6, wherein the at least two angled faces are tapered, and wherein the at least two tapered portions are angled.

8. The shaft/hub connection as recited in claim 7, wherein the tapered portions extend essentially through the hub.

9. The shaft/hub connection as recited in claim 6, wherein the tapered portions of the hub abuttingly engage with the angled faces of the tapered end.

10. The shaft/hub connection as recited in claim 6, wherein the hub is configured to receive the double-D configuration of the tapered end.

11. The shaft/hub connection as recited in claim 6, wherein the hub is provided in a forked configuration.

12. The shaft/hub connection as recited in claim 6, wherein the bore and the aperture are axially aligned.

13. An anti-backlash shaft/hub interface, comprising:
- a shaft adapted to be rotatably driven about an axis of rotation, the shaft having a tapered end providing a tapered, double-D configuration; and
- a hub, having a two prong opening configured to receive the double-D configuration of the tapered end,
- wherein the shaft further comprises a bore, and the hub further comprises an aperture, and wherein a fastener extends through the bore and is received by the aperture to clamp together the shaft and the hub; and
- a collar encompassing an exterior of the hub two prong opening.

14. The shaft/hub interface as recited in claim 13, wherein the bore and the aperture are axially aligned.

15. The shaft/hub interface as recited in claim 13, wherein the tapered end comprises at least two angled faces, and the opening comprises at least two tapered portions.

16. The shaft/hub interface as recited in claim 15, wherein the at least two angled faces abuttingly engage with the at least two tapered portions to eliminate backlash during rotation.

* * * * *